US009392256B2

(12) United States Patent
Jang et al.

(10) Patent No.: US 9,392,256 B2
(45) Date of Patent: Jul. 12, 2016

(54) METHOD AND APPARATUS FOR GENERATING 3-DIMENSIONAL IMAGE DATASTREAM INCLUDING ADDITIONAL INFORMATION FOR REPRODUCING 3-DIMENSIONAL IMAGE, AND METHOD AND APPARATUS FOR RECEIVING THE 3-DIMENSIONAL IMAGE DATASTREAM

(75) Inventors: Moon-seok Jang, Seoul (KR); Jae-jun Lee, Suwon-si (KR); Yong-tae Kim, Seoul (KR); Jae-seung Kim, Yongin-si (KR); Seong-sin Joo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 30 days.

(21) Appl. No.: 12/844,256

(22) Filed: Jul. 27, 2010

(65) Prior Publication Data

US 2011/0023066 A1 Jan. 27, 2011

(30) Foreign Application Priority Data

Jul. 27, 2009 (KR) .................. 10-2009-0068412

(51) Int. Cl.
*G06F 3/00* (2006.01)
*G06F 13/00* (2006.01)
(Continued)

(52) U.S. Cl.
CPC ....... *H04N 13/0066* (2013.01); *H04N 5/44543* (2013.01); *H04N 13/0022* (2013.01); *H04N 13/0025* (2013.01); *H04N 13/0033* (2013.01); *H04N 13/0048* (2013.01); *H04N 13/0059* (2013.01); *H04N 21/235* (2013.01); *H04N 21/2362* (2013.01); *H04N 21/2389* (2013.01);
(Continued)

(58) Field of Classification Search
USPC .......................................... 725/54
See application file for complete search history.

(56) References Cited

U.S. PATENT DOCUMENTS 5,850,352 A * 12/1998 Moezzi et al. ............... 345/419
6,473,129 B1 * 10/2002 Choi ................. H04N 21/26283
348/465
(Continued)

FOREIGN PATENT DOCUMENTS

CN 1954606 A 4/2007
JP 8-9421 A 1/1996
(Continued)

OTHER PUBLICATIONS

International Search Report (PCT/ISA/210) and Written Opinion (PCT/ISA/237) dated Feb. 28, 2011, in PCT Application No. PCT/KR2010/004941.
(Continued)

*Primary Examiner* — Jonathan V Lewis
(74) *Attorney, Agent, or Firm* — Sughrue Mion, PLLC

(57) ABSTRACT

A method of generating a 3-dimensional (3D) image datastream is provided. The method includes generating an elementary stream including an encoded bit string of 3D image data; generating at least one packetized elementary stream by packetizing the elementary stream; generating at least one section including service related information of the 3D image data; inserting 3D image reproduction information for reproducing the 3D image data into a program guide information section from among the at least one section; generating at least one transport stream packet for each of the at least one section and the at least one packetized elementary stream; and generating a transport stream by multiplexing the at least one transport stream packet.

6 Claims, 16 Drawing Sheets

(51) Int. Cl.

| | | |
|---|---|---|
| *H04N 5/445* | (2011.01) | |
| *H04N 13/00* | (2006.01) | |
| *H04N 21/482* | (2011.01) | |
| *H04N 21/235* | (2011.01) | |
| *H04N 21/2389* | (2011.01) | |
| *H04N 21/435* | (2011.01) | |
| *H04N 21/84* | (2011.01) | |
| *H04N 21/2362* | (2011.01) | |
| *H04N 21/434* | (2011.01) | |

(52) U.S. Cl.
CPC ......... *H04N 21/435* (2013.01); *H04N 21/4345* (2013.01); *H04N 21/482* (2013.01); *H04N 21/84* (2013.01)

(56) References Cited

U.S. PATENT DOCUMENTS

| | | | | |
|---|---|---|---|---|
| 6,801,575 B1* | 10/2004 | Crinon | ................ | 375/240.26 |
| 6,853,385 B1* | 2/2005 | MacInnis et al. | ............ | 345/629 |
| 6,867,781 B1 | 3/2005 | Van Hook et al. | | |
| 7,975,399 B2* | 7/2011 | Kikinis | .................... | 34/420 |
| 8,040,917 B2* | 10/2011 | Ko | ..................... | H04N 21/235 370/466 |
| 8,561,109 B2* | 10/2013 | Asbun | ................. | H04N 21/235 725/37 |
| 2001/0006404 A1 | 7/2001 | Yun | | |
| 2003/0048354 A1 | 3/2003 | Takemoto et al. | | |
| 2004/0103432 A1* | 5/2004 | Barrett | ..................... | 725/39 |
| 2004/0221307 A1* | 11/2004 | Arai et al. | ..................... | 725/44 |
| 2005/0097603 A1* | 5/2005 | Kikinis | ........................ | 725/44 |
| 2005/0193425 A1* | 9/2005 | Sull et al. | ................... | 725/135 |
| 2006/0268987 A1* | 11/2006 | Ha | ........................ | H04N 13/0011 375/240.16 |
| 2006/0290778 A1 | 12/2006 | Kitaura et al. | | |
| 2007/0002041 A1* | 1/2007 | Kim | ..................... | H04N 9/8205 345/419 |
| 2007/0120972 A1 | 5/2007 | Kim et al. | | |
| 2008/0279464 A1 | 11/2008 | Ahn et al. | | |
| 2008/0303893 A1 | 12/2008 | Kim et al. | | |
| 2008/0310499 A1* | 12/2008 | Kim et al. | ................ | 375/240.01 |
| 2009/0009594 A1* | 1/2009 | Kawai | ............... | G02B 27/2278 348/54 |
| 2009/0013371 A1 | 1/2009 | Shibahara | | |
| 2009/0040372 A1* | 2/2009 | Bae | .................... | H04N 21/235 348/436.1 |
| 2009/0044073 A1* | 2/2009 | Cho | .................. | H03M 13/2721 714/758 |
| 2009/0282429 A1* | 11/2009 | Olsson et al. | ................... | 725/10 |
| 2009/0288125 A1* | 11/2009 | Morioka | ..................... | 725/110 |
| 2010/0157025 A1* | 6/2010 | Suh et al. | ..................... | 348/51 |
| 2010/0182403 A1* | 7/2010 | Chun et al. | ..................... | 348/43 |
| 2010/0277568 A1 | 11/2010 | Yun et al. | | |
| 2011/0234755 A1* | 9/2011 | Suh et al. | ..................... | 348/43 |
| 2011/0242278 A1* | 10/2011 | Yang | ................. | H04N 13/0022 348/43 |
| 2011/0261158 A1* | 10/2011 | Suh | .................... | H04N 13/0059 348/43 |

FOREIGN PATENT DOCUMENTS

| | | | |
|---|---|---|---|
| JP | 10-150608 | A | 6/1998 |
| JP | 2003-111101 | A | 4/2003 |
| JP | 2005-6114 | A | 1/2005 |
| JP | 2005-73049 | A | 3/2005 |
| JP | 2005-318410 | A | 11/2005 |
| JP | 2007-151125 | A | 6/2007 |
| JP | 2007-300610 | A | 11/2007 |
| JP | 2008-500790 | A | 1/2008 |
| JP | 2009-17389 | A | 1/2009 |
| KR | 10-0585966 | B1 | 6/2006 |
| KR | 10-0716142 | B1 | 5/2007 |
| KR | 10-2008-0099630 | A | 11/2008 |
| KR | 10-2008-0108941 | A | 12/2008 |
| KR | 10-2009-0062216 | A | 6/2009 |
| KR | 10-2009-0066386 | A | 6/2009 |
| WO | 2005/114998 | A1 | 12/2005 |
| WO | 2007/064159 | A1 | 6/2007 |
| WO | WO 2008013352 A1 * | | 1/2008 ............ H04N 13/00 |
| WO | 2009/075418 | A1 | 6/2009 |

OTHER PUBLICATIONS

Communication dated Feb. 12, 2014 issued by the Japanese Patent Office in counterpart Japanese Patent Application No. 2012-522758.
Communication dated Jan. 29, 2014 issued by the European Patent Office in counterpart European Patent Application No. 10804708.5.
Communication dated Dec. 23, 2013 issued by the State Intellectual Property Office of the People's Republic of China in counterpart Chinese Patent Application No. 201080032679.2.
Communication dated Sep. 3, 2014 from the State Intellectual Property Office of P.R. China in a counterpart application No. 201080032679.2.
Communication issued on Nov. 25, 2014 by Japanese Patent Office in related application No. 2012-522758.
Communication issued Nov. 12, 2015 by the European Patent Office in counterpart European Application No. 10804708.5.
Communication from the Korean Intellectual Property Office dated Jun. 18, 2015 in a counterpart Korean application No. 10-2009-0068412.
Communication from the Japanese Patent Office dated Aug. 18, 2015 in a counterpart Japanese application No. 2012-522758.
Communication issued Feb. 23, 2016, issued by the Japanese Patent Office in counterpart Japanese Patent Application No. 2015-33886 English translation.
Communication issued Feb. 24, 2016, issued by the Korean Intellectual Property Office in counterpart Korean Patent Application No. 10-2009-0068412.

* cited by examiner

FIG. 3

| Value | Description |
|---|---|
| 0x00 | Side by side |
| 0x01 | Top and bottom |
| 0x02 | Vertical line interleaved |
| 0x03 | Horizontal line interleaved |
| 0x04 | Checker board |
| 0x05 | Frame sequential |
| 0x06 | Field sequential |
| 0x07 | First view image in multiple stream type |
| 0x08 | Second view image in multiple stream type |
| 0x09 | Depth map |
| 0x0A | 2D image interval in a 3D image format |
| 0x0B~0x3F | reserved |

FIG. 4

| Type | LR_indicator = 1 | | LR_indicator = 0 | |
|---|---|---|---|---|
| | Left view | Right view | Left view | Right view |
| Side by side | Left side | Right side | Right side | Left side |
| Top and bottom | Top side | Bottom side | Bottom side | Top side |
| Vertical line interleaved | Odd line | Even line | Even line | Odd line |
| Horizontal line interleaved | Odd line | Even line | Even line | Odd line |
| Checker board | First pel of first line | First pel of second line | First pel of second line | First pel of first line |
| Frame sequential | Odd frame | Even frame | Even frame | Odd frame |
| Field sequential | Top field | Bottom field | Bottom field | Top field |
| Multiple stream type | First view image | Secondary view image | Secondary view image | Primary view image |

FIG. 5
```
            unsigned int(1)    temporal_local_3d_indicator;    — 510
520 — if(temporal_local_3d_indicator) {
            unsigned int(40)   remaining_3d_pictures;          — 530
            }
```
FIG. 6
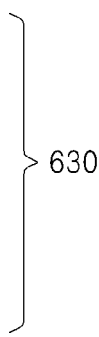
FIG. 7
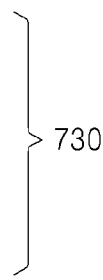

```
            unsigned int(1)    imbalance_info_indicator;  ——1110
1120 —— if(imbalance_info_indicator) {
            unsigend int(8)    imbalance_offset;  ——1130
        }
```

FIG. 12

```
        unsigned int(1)    imbalance_info_indicator;  ── 1110
1220 ── if(imbalance_info_indicator) {
        unsigend int(8)    imbalance_offset;    ⎫
        unsigend int(8)    imbalance_scale;     ⎬ 1230
        }                                       ⎭
```

FIG. 13

```
        unsigned int(1)    imbalance_info_indicator;  ──1110
1320 ── if(imbalance_info_indicator) {
        unsigend int(8)    first_value;              ⎫
        unsigend int(2)    increment[255];           ⎬ 1330
        }                                            ⎭
```

FIG. 14

```
unsigned int(16)  threed_info_start_code;      —1410
unsigned int(6)   3d_format_type;              —1420
unsigned int(1)   LR_indicator;                —1430
unsigned int(1)   Full_Res_indicator;          —1440
unsigned int(1)   spatial_local_3d_indicator;  — 710
unsigned int(1)   temporal_local_3d_indicator; — 510
unsigned int(1)   is_cam_params_changed;       — 810
unsigned int(1)   is_safety_params_changed;    — 910
unsigned int(1)   imbalance_info_indicator;    —1110
unsigned int(3)   reserved;

720 — if(spatial_local_3d_indicator) {
        unsigned int(16)  horizontal_offset;    ⎫
        unsigned int(16)  vertical_offset;      ⎬ 730
        unsigned int(16)  local_3d_width;       ⎪
        unsigned int(16)  local_3d_height;      ⎭
      }

520 — if(temporal_local_3d_indicator) {
        unsigned int(40)  remaining_3d_pictures;  — 530
      }

820 — if(is_cam_params_changed){
        unsigned int(32)  rotation[3];            ⎫
        unsigned int(32)  translation[3];         ⎪
        unsigned int(32)  primary_focal_length;   ⎪
        unsigned int(32)  secondary_focal_length; ⎪
        unsigned int(32)  aspect_ratio;           ⎬ 830
        unsigned int(16)  primary_principal_point_x;  ⎪
        unsigned int(16)  primary_principal_point_y;  ⎪
        unsigned int(16)  secondary_principal_point_x; ⎪
        unsigned int(16)  secondary_principal_point_y; ⎭
      }

920 — if(is_safety_params_changed) {
        unsigned int(16)  expected_display_width;   ⎫
        unsigned int(16)  expected_display_height;  ⎪
        unsigned int(16)  expected_viewing_distance;⎬ 930
        int(16)           min_of_disparity;         ⎪
        int(16)           max_of_disparity;         ⎭
      }

1220 — if(imbalance_info_indicator) {
        unsigned int(8)   imbalance_offset;   ⎫ 1230
        unsigned int(8)   imbalance_scale;    ⎭
      }
```

FIG. 16

| descriptor_tag | Identification |
|---|---|
| 251 | 3d_camera_descriptor |
| 252 | 3d_safety_descriptor |
| 253 | local_3d_descriptor |
| 254 | imbalance_descriptor |
| 255 | 3d_info_descriptor |

FIG. 17

| Syntax | No. of bits |
|---|---|
| 3d_info_descriptor(){ | |
| descriptor_tag | 8 |
| descriptor_length | 8 |
| threed_info_start_code | 32 |
| 3d_format_type | 6 |
| LR_indicator | 1 |
| Full_Res_indicator | 1 |
| } | |

FIG. 18

| Syntax | No. of bits |
| --- | --- |
| 3d_camera_descriptor(){ | |
| descriptor_tag | 8 |
| descriptor_length | 8 |
| rotation[3] | 32*3 |
| translation[3] | 32*3 |
| primary_focal_length | 32 |
| secondary_focal_length | 32 |
| aspect_ratio | 32 |
| primary_principal_point_x | 16 |
| primary_principal_point_y | 16 |
| secondary_principal_point_x | 16 |
| secondary_principal_point_y | 16 |
| } | |

FIG. 19

| | Syntax | No. of bits |
|---|---|---|
| 1900 — | 3d_safety_descriptor(){ | |
| 1910 — | descriptor_tag | 8 |
| 1920 — | descriptor_length | 8 |
| 1930 { | expected_display_width | 16 |
| | expected_display_height | 16 |
| | expected_viewing_distance | 16 |
| | min_of_disparity | 16 |
| | max_of_disparity | 16 |
| | } | |

FIG. 20

| | Syntax | No. of bits |
|---|---|---|
| 2000 — | local_3d_descriptor(){ | |
| 2010 — | descriptor_tag | 8 |
| 2020 — | descriptor_length | 8 |
| 2030 { | horizontal_offset | 16 |
| | vertical_offset | 16 |
| | local_3d_width | 16 |
| | local_3d_height | 16 |
| | remaining_3d_pictures | 32 |
| | } | |

| Syntax | No. of bits |
|---|---|
| 2100 — imbalance_descriptor(){ | |
| 2110 — descriptor_tag | 8 |
| 2120 — descriptor_length | 8 |
| 2130 { imbalance_offset | 8 |
| imbalance_scale | 8 |
| } | |

METHOD AND APPARATUS FOR GENERATING 3-DIMENSIONAL IMAGE DATASTREAM INCLUDING ADDITIONAL INFORMATION FOR REPRODUCING 3-DIMENSIONAL IMAGE, AND METHOD AND APPARATUS FOR RECEIVING THE 3-DIMENSIONAL IMAGE DATASTREAM

CROSS-REFERENCE TO RELATED PATENT APPLICATION

This application claims priority from Korean Patent Application No. 10-2009-0068412, filed on Jul. 27, 2009, in the Korean Intellectual Property Office, the disclosure of which is incorporated herein in its entirety by reference.

BACKGROUND

1. Field

Exemplary embodiments relate to transmitting and receiving a datastream including three-dimensional (3D) image data, in a digital broadcasting system.

2. Description of the Related Art

In order to reproduce 3D image data while maintaining compatibility with a conventional two-dimensional (2D) digital broadcasting system, additional information showing characteristics of the 3D image is required. A transmitting terminal providing an image service may transmit encoded data of a 3D image, and may transmit additional information about the 3D image via an additional channel. A receiving terminal receiving the image service may receive the encoded data and the additional information via at least two channels.

In order not to occupy an additional channel, the additional information may be provided in the form of metadata added to existing data, via the same channel as the encoded data.

SUMMARY

Exemplary embodiments provide a method and apparatus for transmitting and receiving additional information for smooth reproduction of a 3D image, by using program guide information in a broadcasting transceiving system.

According to an aspect of an exemplary embodiment, there is provided a method of generating a 3D image datastream, the method including: generating an elementary stream including an encoded bit string of 3D image data; generating at least one packetized elementary stream by packetizing the elementary stream; generating at least one section including service related information of the 3D image data; inserting 3D image reproduction information required for reproducing the 3D image data into a program guide information section from among the generated at least one section; generating at least one transport stream packet for each of the at least one section and the at least one packetized elementary stream; and generating a transport stream by multiplexing the generated at least one transport stream packet.

The inserting of the 3D image reproduction information may include: generating at least one 3D image reproduction descriptor including the 3D image reproduction information; and inserting the 3D image reproduction descriptor into a descriptor area of an event information table section from among the program guide information section.

The method may further include transmitting the transport stream. Also, the method may further include storing the transport stream.

According to an aspect of another exemplary embodiment, there is provided a method of receiving a 3D image datastream, the method including: separating at least one transport stream packet by demultiplexing a received transport stream; restoring at least one packetized elementary stream including 3D image data, and at least one section including service related information of the 3D image data, by depacketizing the at least one transport stream packet; restoring an elementary stream by depacketizing the at least one packetized elementary stream; extracting 3D image reproduction information that is required to reproduce 3D image data from a program guide information section from among the at least one section; and restoring the 3D image data by decoding data of the elementary stream.

The method may further include reproducing the restored 3D image data by using the 3D image reproduction information.

The 3D image reproduction descriptor may include a 3D information start descriptor indicating that the 3D image datastream is included in a corresponding program.

The 3D image reproduction descriptor may further include at least one of an interval 3D reproduction descriptor that indicates temporal intervals or spatial intervals that are reproduced in 3D from among entire image data, a 3D camera descriptor that is about cameras that obtained the 3D image, a low fatigue descriptor that lessens viewing awkwardness generated while reproducing the 3D image, and a right and left imbalance descriptor that indicates an imbalance state of the left view image and the right view image.

The 3D information start descriptor may be elementary information for smoothly reproducing the 3D image data, and may include 3D image format information, which indicates formats of a left view image and a right view image of the 3D image, right and left arrangement information, which indicates an arrangement order of the right view image and the left view image, and full resolution information, which indicates resolution of the left view image and the right view image forming the 3D image.

The interval 3D reproduction descriptor, the 3D camera descriptor, the low fatigue descriptor, and the right and left imbalance descriptor from among the 3D image reproduction descriptor are additional information for smoothly reproducing the 3D image data, aside from the elementary information.

The right and left imbalance descriptor may be expressed by using one of an offset between a left view image pixel value and a right view image pixel value, a linear function between the left view image pixel value and the right view image pixel value, and a look-up table between the left view image pixel value and the right view image pixel value.

The additional information may include an indicator indicating whether each piece of additional information is defined.

According to another aspect of the exemplary embodiments, there is provided an apparatus for generating a 3D image datastream, the apparatus including: an elementary stream generator which generates an elementary stream including an encoded bit string of 3D image data; a packetized elementary stream generator which generates at least one packetized elementary stream by packetizing the elementary stream; a section generator which generates at least one section describing service related information of the 3D image data; a 3D image reproduction information inserter which inserts 3D image reproduction information required to reproduce the 3D image data into a program guide information section from among the at least one section; a transport stream packet generator which generates at least one transport stream packet for each of the at least one section and at least one packetized elementary stream, and a transport stream generator which generates a transport stream by multiplexing the generated at least one transport stream packet, The apparatus may further include a transport stream transmitter which transmits the transport stream.

According to an aspect of another exemplary embodiment, there is provided an apparatus for receiving a 3D image datastream, the apparatus including: a transport stream demultiplexer which separates at least one transport packet by demultiplexing a received transport stream; a transport stream packet depacketizer which restores at least one packetized elementary stream including 3D image data, and at least one section including service related information of the 3D image data, by depacketizing the at least one transport stream packet; a packetized elementary stream depacketizer which restores an elementary stream by depacketizing the at least one packetized elementary stream; a 3D image reproduction information extractor which extracts 3D image reproduction information required to reproduce a 3D image, from a program guide information section from among the at least one section; and a 3D image restorer which restores the 3D image data by decoding data of the elementary stream.

The apparatus may further include a 3D image reproducer which reproduces the restored 3D image data by using the 3D image reproduction information.

According to an aspect of another exemplary embodiment, there is provided a computer readable recording medium having recorded thereon a program for executing the method of generating a 3D image datastream. Also, according to an aspect of the another exemplary embodiment, there is provided a computer readable recording medium having recorded thereon a program for executing the method of receiving a 3D image datastream.

BRIEF DESCRIPTION OF THE DRAWINGS

The above and other aspects will become more apparent by describing in detail exemplary embodiments with reference to the attached drawings in which:

FIG. 3 is a table showing 3D image format information according to an exemplary embodiment;

FIG. 4 is a table showing right and left arrangement information according to an exemplary embodiment;

FIG. 5 illustrates temporal interval 3D reproduction information according to an exemplary embodiment;

FIG. 6 illustrates temporal interval 3D reproduction information according to another exemplary embodiment;

FIG. 7 illustrates spatial interval 3D reproduction information according to an exemplary embodiment;

FIG. 12 illustrates right and left imbalance information according to another exemplary embodiment;

FIG. 13 illustrates right and left imbalance information according to another exemplary embodiment;

FIG. 14 illustrates 3D image reproduction information according to an exemplary embodiment;

FIG. 16 is a table showing a descriptor area tag to which a 3D image reproduction descriptor is to be inserted, according to an exemplary embodiment;

FIG. 17 is a table showing a 3D information start descriptor inserted into a descriptor area, according to an exemplary embodiment;

FIG. 18 is a table showing a 3D camera descriptor inserted into a descriptor area, according to an exemplary embodiment;

FIG. 19 is a table showing a low fatigue descriptor inserted into a descriptor area, according to an exemplary embodiment;

FIG. 20 is a table showing an interval 3D descriptor inserted into a descriptor area, according to an exemplary embodiment;

DETAILED DESCRIPTION OF THE EXEMPLARY EMBODIMENTS

Hereinafter, the exemplary embodiments will be described more fully with reference to the accompanying drawings.

Figure 1:
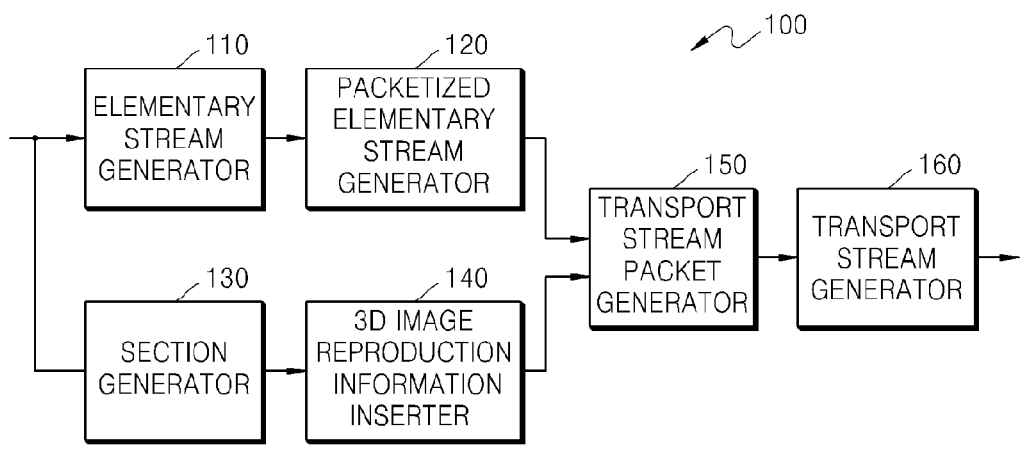
FIG. 1 is a block diagram of an apparatus for generating a 3D image datastream, according to an exemplary embodiment.

FIG. 1 is a block diagram of an apparatus 100 for generating a 3D image datastream, according to an exemplary embodiment.

The apparatus 100 according to the current exemplary embodiment includes an elementary stream generator 110, a packetized elementary stream (PES) generator 120, a section generator 130, a 3D image reproduction information inserter 140, a transport stream (TS) packet generator 150, and a TS generator 160.

The elementary stream generator 110 generates an elementary stream including an encoded bit string of multimedia, such as video or audio. Specifically, the elementary stream generator 110 may generate an elementary stream including an encoded bit string of a 3D image.

The PES generator 120 generates at least one PES by receiving and packetizing the elementary stream output from the elementary stream generator 110. The PES may be divided into a PES header area and a PES payload area. At least a part of the elementary stream may be stored in the PES payload area.

The section generator 130 generates at least one section about program related information of a 3D image. A program is a standard unit including a bit string of video and audio.

In a digital broadcast, several elementary streams are multiplexed, and then transmitted through various transport media or networks. A plurality of elementary streams form one service, and a plurality of services form one TS. Datastreams formed accordingly are transmitted to various physical media via various networks.

In order to search for datastream desired by a viewer, transmit the datastream to a receiver, and provide information about contents and types of individual programs provided by each service, separate information aside from datastream defined in the Moving Picture Experts Group (MPEG)-2 standard needs to be transmitted. The separate information is referred to as service information or program guide information. The separate information may be transmitted using a current digital broadcasting system standard, such as the Digital Video Broadcasting (DVB) standard utilized in Europe or the Advanced Television Systems Committee (ATSC) standard utilized in the United States.

A section is a data form that may be transmitted via a TS, and mainly includes service related information, such as service information and program guide information. In other words, service related information may include or be divided into at least one section. The service related information including at least one section may be program specific information (PSI), such as a program association table (PAT) or a program map table (PMT), or system information (SI), such as an event information table (EIT).

The PSI is required when an MPEG-2 system demultiplexes a TS into prescribed data. In DVB, the SI is called SI, but in the ATSC, the SI is called a program and system information protocol (PSIP). However, the SI and the PSIP have similar functions, such as providing an electronic program guide (EPG) service. The section generator 130 may generate a section including service related information of an encoded 3D image.

The 3D image reproduction information inserter 140 inserts 3D image reproduction information required to reproduce a 3D image into a program guide information section from among the at least one section generated by the section generator 130. The program guide information section into which the 3D image reproduction information is inserted, and other sections, are output to the TS packet generator 150.

The 3D image reproduction information may be inserted into a program guide information section including EPG information. The EPG information may include a broadcasting schedule, which is shown to a user by using a settop box or a personal video recorder (PVR).

The program guide information section including the EPG information may be an EIT section. An EIT is a table for transmitting data of the broadcasting schedule, and provides a temporal order and detailed contents of individual broadcasts. The 3D image reproduction information according to an exemplary embodiment may be inserted into the EIT in a descriptor format. In this case, the 3D image reproduction information inserter 140 generates at least one 3D image reproduction descriptor including the 3D image reproduction information, and inserts the at least one 3D image reproduction descriptor into a descriptor area of the EIT section.

The TS packet generator 150 generates at least one TS packet with respect to the at least one section generated by the section generator 130 and the at least one PES generated by the PES generator 120.

The TS packet has a fixed length, and starts from a TS header area having 4 bytes. Data of a section of a PES may be inserted into a TS payload area following the TS header area.

The apparatus 100 according to the exemplary embodiment inserts 3D image reproduction information required to reproduce a 3D image into a PES, a TS packet, or a section. By inserting the 3D image reproduction information into program information of a section level, information required to accurately reproduce a 3D image may be transmitted.

The TS generator 160 generates a TS by multiplexing the at least one TS packet generated by the TS packet generator 150. The TS is a continuation of the at least one TS packet.

The apparatus 100 may further include a transmitter (not shown) that transmits the generated TS. Also, the apparatus 100 may further include a storage unit (not shown) that stores the TS in a storage medium.

The 3D image reproduction information for accurate reproduction of a 3D image may include 3D start information which informs starting of the 3D image reproduction information. In order to notify a decoding terminal that the 3D image reproduction information needs to be interpreted, the 3D start information may include information that the 3D image reproduction information is contained in a corresponding data stream and the 3D image reproduction information starts from the 3D start information.

Also, 3D image format information, which indicates formats of a left view image and a right view image of the 3D image, right and left arrangement information, which indicates an arrangement order of the left and right view images, and full resolution information may be established as elementary information for reproducing the 3D image.

Further, when there is elementary information, interval 3D reproduction information, which indicates temporal intervals or spatial intervals reproduced in 3D from among entire image data, 3D camera information, which is about a camera that obtained the 3D image, low fatigue information, which lessens viewing awkwardness that may be generated while reproducing the 3D image, and right and left imbalance information, which indicates an imbalance state of the left and right view images, may be established as additional information for reproducing the 3D image.

The right and left imbalance information may be defined as an offset between a left view image pixel value and a right view image pixel value. Also, the right and left imbalance information may be defined by using a linear function relationship between the left view image pixel value and the right view image pixel value. The right and left imbalance information may be accurately expressed by using a look up table between the left view image pixel value and the right view image pixel value.

Definition of the additional information of the 3D image reproduction information is variable, and thus the additional information may include indicator information that indicates whether the additional information is defined.

Detailed characteristics of the 3D image reproduction information will now be described with reference to the accompanying drawings. In other words, 3D image format information of FIG. 3, right and left arrangement information of FIG. 4, temporal interval 3D reproduction information of FIGS. 5 and 6, spatial interval 3D reproduction information of FIG. 7, 3D camera information of FIG. 8, low fatigue information of FIG. 9, and right and left imbalance information of FIG. 11 are described as the 3D image reproduction information.

The 3D image reproduction descriptor may include a 3D information start descriptor corresponding to 3D start information. Also, the 3D image reproduction descriptor may further include descriptors corresponding to the 3D image format information, the 3D camera information, the low fatigue information, and the right and left imbalance information.

In a TS system utilizing a predetermined image communication standard, 3D image reproduction information may be inserted into a space pre-assigned in a PES, a TS packet, or a section, according to an embodiment. Accordingly, the apparatus 100 may be applied to a TS system following an existing image communication standard without changing the TS system. Also, since the pre-assigned space is used, additional channel or additional storage space is not required.

The EIT section is a program guide information section commonly used in the ATSC standard and the DVB standard, and thus the transmitting and receiving of the datastream to which the 3D image reproduction information is inserted according to an exemplary embodiment can be applied in well-known digital broadcasting standards.

Figure 2:
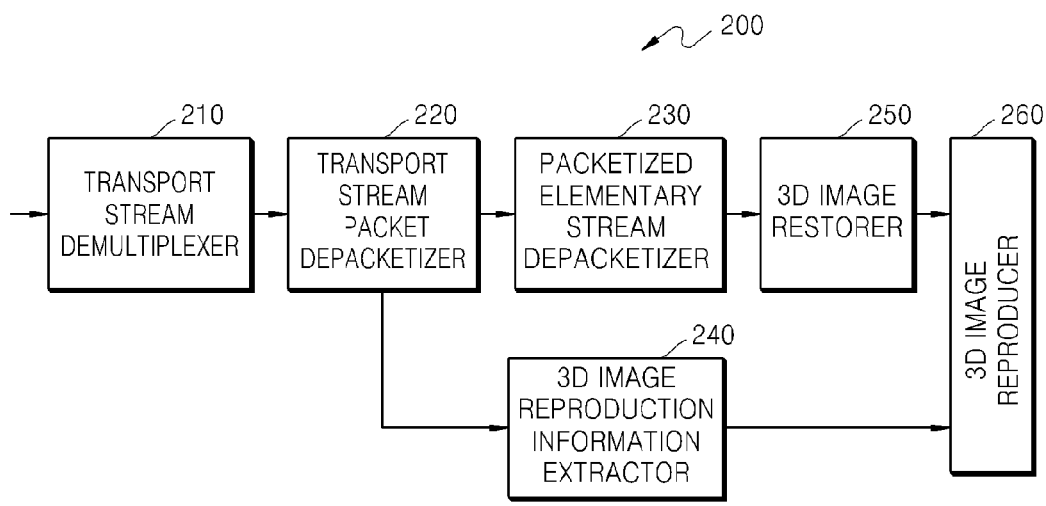
FIG. 2 is a block diagram of an apparatus for receiving a 3D image datastream, according to an exemplary embodiment.

FIG. 2 is a block diagram of an apparatus 200 for receiving a 3D image datastream, according to an exemplary embodiment.

The apparatus 200 according to the exemplary embodiment includes a TS demultiplexer 210, a TS packet depacketizer 220, a PES depacketizer 230, a 3D image reproduction information extractor 240, a 3D image restorer 250, and a 3D image reproducer 260.

The TS demultiplexer 210 separates at least one TS packet by demultiplexing a TS received by the apparatus 200. The TS may be divided into TS packets having a fixed length.

The TS packet depacketizer 220 restores at least one PES and at least one section by depacketizing the at least one TS packet separated by the TS demultiplexer 210. The at least one PES includes 3D image data, and the at least one section includes service related information of the 3D image data.

A packet identifier (PID), which is identification information indicating a type of data transmitted by a TS packet, is recorded in a header area of the TS packet. Program list information is contained in a PAT, and a PID of a TS packet transmitting the PAT is set to be 0.

When the TS is received, a PAT is obtained by searching for a TS packet having a PID that is set to 0, and the PID of the TS packet transmitting a PMT is extracted by analyzing the PAT.

Since the PMT contains information related to each program, a PID of a TS packet containing a bit string forming a program is determined by analyzing the PMT. Accordingly, a TS containing a desired program, such as audio or video, may be accessed.

An EIT provides contents of programs for at least the next 3 hours on all channels, and transmits information of individual programs, such as a title, a starting time, and a broadcasting period. Such information transmitted by the EIT may be used as EPG information.

The PES depacketizer 230 restores an elementary stream by depacketizing the at least one PES restored by the TS packet depacketizer 220. The elementary stream may be a program, such as audio or video. Specifically, the elementary stream restored by the PES depacketizer 230 may include encoded data of a 3D image.

The 3D image reproduction information extractor 240 extracts 3D image reproduction information from the at least one section that is demultiplexed and restored. The 3D image reproduction information extractor 240 may extract the 3D image reproduction information from a program guide information section from among the at least one restored section.

The 3D image reproduction information extractor 240 may extract a 3D image reproduction descriptor from a descriptor area of the program guide information section. Here, the program guide information section may be an EIT section.

The 3D image reproduction descriptor may include a 3D information start descriptor indicating that the 3D image datastream is included in a corresponding program. Also, the 3D image reproduction descriptor may include at least a 3D image start descriptor, an interval 3D reproduction descriptor, a 3D camera descriptor, a low fatigue descriptor, and a right and left imbalance descriptor, as information related to reproducing the 3D image.

The 3D image reproduction information extracted and used by the apparatus 200 may correspond to the 3D image reproduction information of the apparatus 100 described with reference to FIG. 1.

Accordingly, the 3D image reproduction information extractor 240 may extract 3D image format information, right and left arrangement information, full resolution information, temporal interval 3D reproduction information, spatial interval 3D reproduction information, 3D camera information, low fatigue information, and right and left imbalance information, as 3D image reproduction information, from the 3D image reproduction descriptor.

The 3D image restorer 250 restores a 3D image by decoding data of an elementary stream. A left view image and a right view image may be separately restored, according to a 3D image format. Alternatively, a left view image and a right view image for a 3D image interval and a 2D image for a 2D image interval may be restored to be mixed in an image sequence.

The 3D image reproducer 260 reproduces the 3D image restored by the 3D image restorer 250 in a 3D reproduction method, by using the 3D image reproduction information.

Since the apparatus 200 extracts 3D image reproduction information that is recognizable by a 3D image reproduction system, a 3D content broadcasting service having low fatigue caused by viewing a 3D image may be provided, while maintaining a 3D effect of the 3D image. Also, since the 3D image datastream, which is restored into the 3D content broadcasting service by the apparatus 200 still has a data structure used in a conventional 2D image decoder, the apparatus 200 may be compatible with conventional 2D image decoders. Moreover, since an additional channel, an additional datastream, or an additional storage space is not required so as to receive 3D image reproduction information, the apparatus 200 may be used in a limited environment.

The apparatus 100 and the apparatus 200 may be used in a 3D broadcasting system, a 3D digital television (TV) system, a 3D package media system, or a 3D image decoder in a computer. Accordingly, a 3D digital broadcast providing 2D contents and 3D contents while maintaining compatibility with a conventional digital broadcasting system may be provided.

The above exemplary embodiments are used in a TS-based transmission system and receiving system, but the embodiments where 3D image reproduction information is inserted in a PES level may be used in a program stream-based system.

3D image reproduction information according to an exemplary embodiment will now be described with reference to FIGS. 3 through 14.

FIG. 3 is a table showing 3D image format information according to an exemplary embodiment.

In order to reproduce a 3D image while maintaining a 3D effect, both of a left view image and a right view image are required. A 3D image format is an image format for including both left view image information and right view image information, and may be a 3D composite format, a 3D sequential format, or a multiple stream format.

The 3D composite format is an image format in which a left view image and a right view image are arranged in one picture. According to the 3D composite format, a 3D image reproduction system may be realized by decoding, restoring, and then rendering a 3D image while using a conventional encoding and decoding system.

Since both the left view image and the right view image are arranged in one picture in the 3D composite format, each of the left and right view images has lower resolution than a general 2D image. However, when a frame rate of a conventional reproduction system is maintained at a predetermined rate or above, most 3D images are reproduced without quality deterioration in the conventional reproduction system. The 3D composite format is a most widely used 3D image format, since the 3D composite format can be used in a conventional reproduction system.

A 3D sequential format is a format in which a left view image and a right view image are arranged in a time axis direction. The 3D sequential format includes a frame sequential format in which a left view frame and a right view frame are continuously and alternately arranged, and a field sequential format in which a left view field and a right view field are continuously and alternately arranged. The frame sequential format is hardly used when a frame rate is equal to or lower than a predetermined frequency, since each frame rate of the left view frame and the right view frame decreases by half, and the field sequential format is widely used.

A multiple stream format is an image format in which each left/right view image forming a 3D image is transmitted/received in an individual stream. The multiple stream format requires a plurality of decoders, but is compatible with a conventional reproduction system. Also, an image may be generated in full resolution. Since right/left view images or multi view images are each stored in a stream unit, the multiple stream format requires a wider bandwidth of a transmission system than the 3D composite format or the 3D sequential format.

The table of FIG. 3 shows values of 3D image format information that can be used by the apparatus 100 and apparatus 200. Hereinafter, in the apparatuses 100 and 200, 3D image format information may be referred to as a variable name called "3d_format_type".

3D image format information may include information about a side-by-side format, a top and bottom format, a vertical line interleaved format, a horizontal line interleaved format, a checkerboard format, a frame sequential format, a field sequential format, a first view image in a multiple stream type format, a second view image in the multiple stream type format, a depth map format, and a 2D image interval in a 3D image format.

In the side-by-side format, a left view image and a right view image are respectively arranged on the left and right of one picture. In the top and bottom format, a left view image and a right view image are respectively arranged on the top and bottom of one picture.

In the vertical line interleaved format, a line of a left view image and a line of a right view image are alternately arranged according to each line in a vertical direction of one picture. In the horizontal line interleaved format, a line of a left view image and a line of a right view image are alternately arranged according to each line in a horizontal direction of one picture. In the checkerboard format, a pel of a left view image and a pel of a right view image are alternately arranged according to both of the horizontal and vertical directions of each pel of one picture.

When a first view image and a second view image are inserted into an individual stream, the first view image in a multiple stream type format only includes the first view image, and the second view image in a multiple stream type format only includes the second view image.

In the depth map format, a map including depth difference information between right and left view images, and one of the right and left view images is transmitted/received.

The 2D image interval in a 3D image format is an image format including a 2D image interval in an image in which a 3D image interval and a 2D image interval are mixed.

'unsigned int' refers to a data type which represents some finite subset of the mathematical integers. '3d_format_type' is an unsigned int variable having 7 bytes, and has a value from 0x00 to 0x7F. According to an exemplary embodiment, 0x00 to 0x0A of the '3d_format_type' respectively corresponds to the side-by-side format, the top and bottom format, the vertical line interleaved format, the horizontal line interleaved format, the checkerboard format, the frame sequential format, the field sequential format, the first view image in a multiple stream type format, the second view image in a multiple stream type format, the depth map format, and the 2D image interval in a 3D image format, thereby defining 3D image format information.

Remaining values of the '3d_format_type', from 0x0B to 0x3F, may be set as reserved bits for any content added later.

FIG. 4 is a table showing right and left arrangement information according to an exemplary embodiment.

When a 3D image that is reproduced as a left view image and a right view image are reversed, visual fatigue experienced from viewing the 3D image may increase. Accordingly, when a 3D image format includes both of the left and right view images, the left and right view images need to be distinguished from each other. Right and left arrangement information indicates whether different view images included in a 3D image format are a left view image or a right view image, and may be defined with the 3D image format.

The table of FIG. 4 shows an arrangement order of a left view image and a right view image in a 3D image format (type) according to right and left arrangement information. In the apparatuses 100 and 200, right and left arrangement information may both be referred to as a variable name called "LR_indicator". When the right and left arrangement information is 1 ('LR_indicator=1'), a left view image and a right view image are respectively arranged on a left side and a right side of a side-by-side format.

Similarly, when the right and left arrangement information is 1 ('LR_indicator=1'), the left and right view images may be respectively arranged on a top side and a bottom side of a top and bottom format, on an odd line and an even line in a vertical line interleaved format, on an odd line and an even line in a horizontal line interleaved format, on a first pel in a first line and a first pel in a second line in a checkerboard format, on an odd frame and an even frame in a frame sequential format, on a top field and bottom field in a field sequential format, and a first view image and a second view image in a multiple stream type format.

When the right and left arrangement information is 0 ('LR_indicator=0'), the left and right view images may be arranged on opposite sides to the description above. Only a left view image and a right view image exist in a stereo image in a multiple stream type format that is applicable to a multi view image, and thus the right and left arrangement information defined in FIG. 4 may be effective.

In the side-by-side format, the top and bottom format, the vertical line interleaved format, the horizontal line interleaved format, and the checkerboard format, a left view image and a right view image are simultaneously arranged in one frame. Here, the resolution of each of the left and right view images is reduced to half, and thus the left and right view images may merge into one 3D image frame.

However, in a multimedia reproduction environment supporting standard resolution, the left and right view images may merge into one frame while maintaining full resolution of the left and right view images, thereby generating a 3D image, with doubled resolution, having the left and right view images with the full resolution.

Accordingly, in a 3D image format where a left view image and a right view image are merged into one frame, it is determined whether a 3D image has doubled resolution as the left and right view images are merged while maintaining full resolution, or has the same resolution as the full resolution as the left and right images are merged while having halved resolution.

Accordingly, in the apparatuses 100 and 200, full resolution information, which indicates whether a left view image and a right view image are merged into a 3D image having doubled resolution, is used. The full resolution information may be referred to as a variable name called "Full_Res_indicator".

The apparatus 200 may obtain full resolution information by parsing a stream. A 3D image restored by decoding a received datastream may be reproduced in 3D by being converted into a 3D image format suitable to a 3D reproduction apparatus by using the full resolution information.

A 2D image interval in a 3D image format, from among 3D image formats, will now be described with reference to FIGS. 5 through 7. Since the 2D image interval in a 3D image format is partially reproduced in 3D, an 'interval 3D image', i.e. an interval that is to be recognized as a 3D image, needs to be defined. The interval 3D image may be divided into a temporal interval 3D image and a spatial interval 3D image.

Temporal interval 3D image information may be expressed in relative time or absolute time. The expressing method may be determined based on a system environment or a system specification.

Exemplary embodiments of temporal interval 3D reproduction information will be described with reference to FIGS. 5 and 6, and an exemplary embodiment of spatial interval 3D reproduction information will be described with reference to FIG. 7. Since the temporal interval 3D reproduction information and the spatial interval 3D reproduction information require a large number of bits, it is determined whether the temporal interval 3D reproduction information and the spatial interval 3D reproduction information are defined by using an indicator. Accordingly, when the indicator is set to 0, interval 3D reproduction information is not defined.

FIG. 5 illustrates temporal interval 3D reproduction information according to an exemplary embodiment.

The temporal interval 3D reproduction information may be expressed in the number of pictures of a 3D image to be reproduced in 3D. In the apparatuses 100 and 200, an indicator indicating whether the temporal interval 3D reproduction information is defined may be referred to as a variable called 'temporal_local_3d_indicator'.

In other words, if 'temporal_local_3d_indicator' is declared as an unsigned int type (510) and 'temporal_local_3d_indicator' has a value of 1 (520), the number of pictures of the interval 3D image may be defined by a variable called 'remaining 3d_pictures', as the temporal interval 3D reproduction information (530). According to an embodiment, when all bits of 'remaining_3d_pictures' are 1, a 3D reproduction mode may be maintained until a corresponding image sequence is completed.

FIG. 6 illustrates temporal interval 3D reproduction information according to another exemplary embodiment.

According to the current exemplary embodiment, a reproduction time of an interval 3D image to be reproduced in 3D may be defined. When 'temporal_local_3d_indicator' is declared as an unsigned int type (610), and 'temporal_local_3d_indicator' has a value of 1 (620), the reproduction time may be defined by 'DTS_3d_period[ ]' indicating a reproduction time of the interval 3D image, as the temporal interval 3D reproduction information (630).

A number in [ ] of 'DTS_3d_period[ ]' shows the reproduction time, and may be relative time or absolute time. When a 3D reproduction interval and a 2D reproduction interval alternately exist and 3D reproduction intervals are separated from each other, 'DTS_3d_period[ ]' may be defined with a plural number. Also, 'marker_bit' may be defined so as to indicate a space between the 3D reproduction intervals that are temporally separated from each other.

FIG. 7 illustrates spatial interval 3D reproduction information according to an exemplary embodiment.

The spatial interval 3D reproduction information indicates a location of a spatial interval 3D area to be reproduced in 3D, in one frame including both of a 2D image and a 3D image. The location of the spatial interval 3D area may be indicated by a coordinate of an upper left corner of a corresponding 3D area, a width, or height information.

In the apparatuses 100 and 200, an indicator which indicates whether the spatial interval 3D reproduction information may be referred to as a variable is called 'spatial_local_3d_indicator'.

In other words, when 'spatial_local_3d_indicator' is declared as an unsigned int type (710) and 'spatial_local_3d_indicator' has a value of 1 (720), a variable 'horizontal_offset' indicating a horizontal offset and a variable 'vertical_offset' indicating a vertical offset as a coordinate of a spatial interval 3D area, a variable 'local_3d_width' indicating a width of the spatial interval 3D area, and a variable 'local_3d_height' indicating a height of the spatial interval 3D area may be defined as the spatial interval 3D reproduction information (730).

Syntax 730 shows when the number of spatial interval 3D areas is 1, but when the number of spatial interval 3D areas is 2 or more, the number of spatial interval 3D areas is defined by a variable called 'number_of_local_3d'. A horizontal offset, a vertical offset, a width, and a height may be defined for each spatial interval 3D area.

Figure 8:
FIG. 8 illustrates 3D camera information according to an exemplary embodiment.

FIG. 8 illustrates 3D camera information according to an exemplary embodiment.

According to 3D camera information in a stereo image, a camera parameter of one view image may be expressed in a relative value based on a camera parameter of another view image. In other words, a camera parameter of a right view image may be expressed based on a coordinate of a left view image, and thus only a relative value may be transmitted/received without defining camera parameters of both of the left view image and the right view image. However, information about coordinates of a focal length and a principal point from among the 3D camera information has an absolute value, and thus cannot be relatively expressed. Accordingly, the focal length and the principal point are separately defined according to each view.

In the apparatuses 100 and 200, an indicator indicating whether 3D camera information is changed may be referred to as a variable called 'is_cam_params_changed'. Since the 3D camera information is large data, the 3D camera information is pre-operated to be newly defined only when current 3D camera information is different from previous 3D camera information, by using 'is_cam_params_changed'. Accordingly, 'is_cam_params_changed' is set to 1 only when the 3D camera information needs to be newly set or to be updated.

For example, when 'is_cam_params_changed' is declared as an unsigned int type (810) and 'is_cam_params_changed' has a value of 1 (820), a variable 'rotation' that indicates rotation angle information between a first view camera and a second view camera in a x-y coordinate, a variable 'translation' indicating translation information between the first view and second view cameras in a x-y coordinate, a variable 'primary_focal_length' indicating focal length information of a first view image, a variable 'secondary_focal_length' indicating focal length information of a second view image, a variable 'aspect_ratio' indicating screen aspect ratio information, a variable 'primary_principal_point_x' indicating x-axis coordinate information of a principal point of a first view image, a variable 'primary_principal_point_y' indicating y-axis coordinate information of a principal point of a first view image, a variable 'secondary_principal_point_x' indicating x-axis coordinate information of a principal point of a second view image, and a variable 'secondary_principal_point_y' indicating y-axis coordinate information of a principal point of a second view image may be defined as 3D camera information (830).

Cameras having the same specifications are used considering a 3D effect, and thus, screen aspect ratio information may be defined only once with respect to a left/right view image or a multi view image. Rotation angle information and parallel translation information may be expressed in relative numbers of a coordinate of a second view image based on a coordinate of a first view image. Focal length and principal point information may be defined according to each view.

3D camera information of a stereo image may be defined once, instead of being defined according to each of a left view image and a right view image as shown in FIG. 8. Meanwhile, in case of a multiple stream type format that is applicable to a multi view image, 3D camera information may be independently defined according to each view, instead of being expressed in a relative number based on a coordinate of one view.

An arrangement of two cameras obtaining two view points may be determined based on 3D camera information. Generally, when a 3D image is reproduced, a 3D image obtained via a parallel camera configuration has lower visual fatigue than a 3D image obtained via a toed-in camera configuration. Accordingly, a 3D image obtained via a toed-in camera configuration may be changed into a 3D image obtained via a parallel camera configuration via a rectification operation using 3D camera information.

An epipolar line may be determined by using 3D camera information, and disparity estimation may be conveniently performed via an epipolar line constraint technique using the epipolar line. As described above, 3D camera information may be used in various post-process operations including the rectification operation and the disparity estimation.

Figure 9:
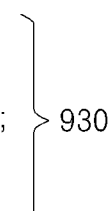
FIG. 9 illustrates low fatigue information according to an exemplary embodiment.
Figures 10, 11:
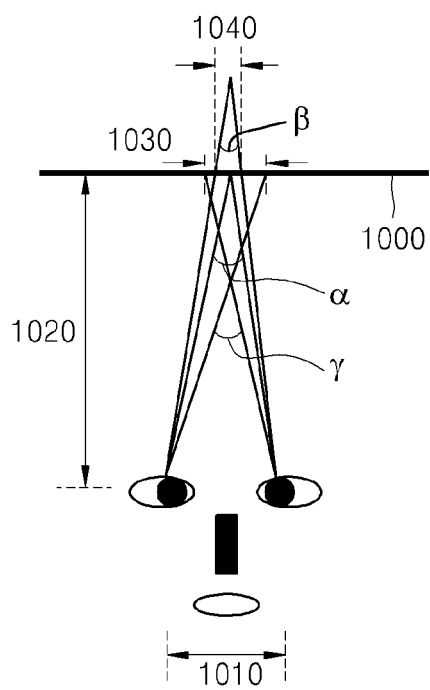
FIG. 10 illustrates a low fatigue range according to an exemplary embodiment.
FIG. 11 illustrates right and left imbalance information according to an exemplary embodiment.

FIG. 9 illustrates low fatigue information according to an exemplary embodiment.

A 3D effect may differ according to the size of a display screen for reproducing a 3D image. Accordingly, when a 3D image is reproduced in an environment that is different from or worse than an expected environment, a post-process operation may be performed so as to reduce visual fatigue. For example, a 3D image may be changed when an actual display size is larger than an expected display size, and thus visual fatigue may occur. Examples of the post-process operation for reducing visual fatigue include a method of generating new left and right view images having adjusted depth by extracting a depth map between the left and right view images, a method of synthesizing an intermediate image, and a method of moving left/right view images in parallel. Low fatigue information may be used to determine which low fatigue operation is to be performed.

In the apparatuses 100 and 200, an indicator indicating whether low fatigue information is changed may be referred to as a variable called 'is_safety_params_changed'. Since low fatigue information is large data, the low fatigue information may be pre-operated to be newly defined only when current low fatigue information is different from previous low fatigue information via 'is_safety_params_changed'. Accordingly, 'is_safety_params_changed' is set to 1 only when low fatigue information is newly set or needs to be updated.

For example, when 'is_safety_params_changed' is declared as an unsigned int type (910) and 'is_safety_params_changed' has a value of 1 (920), a variable 'expected_display_width' indicating expected display width information, a variable 'expected_display_height' indicating expected display height information, a variable 'expected_viewing_distance' indicating expected viewing distance information, a variable 'min_of_disparity' indicating minimum disparity information in a 3D image content, and a variable 'max_of_disparity' indicating maximum disparity information in a 3D image content may be defined as low fatigue information (930).

In order to calculate a screen disparity of a provided 3D image content, disparity ranges in an expected display size, an expected viewing distance, and a 3D image are required. The expected display size and the expected viewing distance are expressed by using the expected display width and height information and the expected viewing distance information. A disparity range in a 3D image may be expressed by using the minimum disparity information and the maximum disparity information in a 3D image content.

Accordingly, it is determined whether the low fatigue operation is to be performed by comparing a disparity range according to an expected display with an actual disparity range by using the low fatigue information.

FIG. 10 illustrates a low fatigue range according to an exemplary embodiment.

A screen disparity range that has allowable visual fatigue of a 3D image may be determined within ±1°. The screen disparity range of the 3D image may be determined based on a display size, a viewing distance, and a disparity range. In order to calculate a low fatigue range, i.e., the screen disparity range that has allowable visual fatigue, a pixel pitch of an actual display is required. The pixel pitch may be determined as a fixed value in a reproduction apparatus.

A low fatigue range will now be described with reference to FIG. 10, wherein a pixel pitch of a display 1000 is 0.159 mm, a display size of the display 1000 is 2.5 inches, and a resolution of the display 1000 is 320×240. A distance 1010 between the eyes of a viewer may be 65 mm, and a viewing distance 1020 may be 300 mm. A disparity range is calculated by using a difference angle $\alpha$ between two sights according to an expected depth, a difference angle $\beta$ between two sights when the depth approaches toward the viewer, and a difference angle $\gamma$ between two sights when the depth withdraws from the viewer.

In FIG. 10, a minimum disparity limit corresponds to the difference angle $\beta$, and a maximum disparity limit corresponds to the difference angle $\gamma$. In other words, the low fatigue range is within ±1°, and is $|\beta-\alpha|<1°$ and $|\gamma-\alpha|1°$. For example, when the difference angle $\alpha$ is 12.37°, the difference angle $\beta$ is 11.37° or more, and the difference angle $\gamma$ is 13.37° or less.

Also, a pixel pitch of the display 1000 may be used to express the low fatigue range in pixel units. When the difference angle $\beta$ of the minimum disparity limit is 11.37°, an image size on the display 100 is 5.32 mm, and when the difference angle $\gamma$ of the maximum display limit is 13.37°, an image size on the display 1000 is 5.73 mm. A pixel unit of disparity may be expressed in a value obtained by dividing the disparity by a pixel pitch. Accordingly, maximum disparity limit pixels may be 5.73/0.159=36 pixels and minimum disparity limit pixels may be −5.32/0.159=−33 pixels. Here, a (−) direction denotes a direction toward the viewer.

It may be determined whether a current 3D image content is in a low fatigue allowable range by comparing a minimum disparity limit and a maximum disparity limit of a maximum allowable disparity range of an actual display system with a minimum disparity and a maximum disparity of an actual 3D image content. When the current 3D image content is not within the low fatigue allowable range, a post-process operation related to low fatigue may be performed.

Right and left imbalance information indicating imbalance between a left view image and a right view image will now be described with reference to FIGS. 11 through 13. Since a plurality of cameras are used to obtain a stereo image (or a multi-view image), even if the cameras have the same specifications, images taken by the cameras may not have the same color impressions according to the settings of the cameras. Such a difference between a left view image and a right view image may deteriorate the performance of a post-process operation, such as disparity estimation. Also, when the left view image and the right view image are reproduced in different color impressions, visual fatigue due to a 3D image may increase.

An operation of compensating for a difference between a left view image and a right view image may be performed as a pre-process or post-process operation. The operation may be performed as a post-process operation after decoding according to the viewer's demands. Here, the right and left imbalance information is required for the post-process operation after decoding.

FIG. 11 illustrates right and left imbalance information according to an exemplary embodiment.

A simple right and left imbalance model is represented by Equation 1 below.

$$R = L + \text{offset1} \quad (1)$$

Here, R denotes a pixel value of a right view image, L denotes a pixel value of a left view image, and offset1 denotes a variable indicating an offset value between the left and right view images. In other words, imbalance information between the left and right view images is defined by one offset value. The simple right and left imbalance model is preferable when the right and left offset information cannot assign a large number of bits to right and left imbalance information.

For example, in the apparatuses 100 and 200, an indicator indicating whether right and left imbalance information is defined may be referred to as a variable called 'imbalance_info_indicator', which has a value of 1 only when the right and left imbalance information is defined.

According to the syntax of right and left imbalance information according to Equation 1, when 'imbalance_info_indicator' is declared as an unsigned int type (1110) and 'imbalance_info_indicator' has a value of 1 (1120), a variable 'imbalance_offset' indicating right and left offset information may be defined as right and left imbalance information (1130).

FIG. 12 illustrates right and left imbalance information according to another exemplary embodiment.

A right and left imbalance model according to a linear function is represented by Equation 2 below.

$$R = \text{scale} \times L + \text{offset2} \quad (2)$$

Here, R denotes a pixel value of a right view image, L denotes a pixel value of a left view image, scale denotes a slope of a linear function, and offset2 denotes a variable indicating an offset value between the left view image and the right view image. In other words, imbalance information between the left and right view images may be defined as a linear relationship between the left and right view images. The number of bits assigned to 'scale' for slope information may be adjusted according to the accuracy of the linear function.

According to the syntax of right and left imbalance information according to Equation 2, when 'imbalance_info_indicator' is declared as an unsigned int type (1210) and 'imbalance_info_indicator' has a value of 1 (1220), a variable 'imbalance_offset' indicating right and left offset information and a variable 'imbalance_scale' indicating slope information of a linear function of a right and left imbalance model may be defined as the right and left imbalance information, respectively (1230).

FIG. 13 illustrates right and left imbalance information according to another exemplary embodiment.

A right and left imbalance model according to a look up table is represented by Equation 3 below.

$$R[0] = \text{first\_value}$$

$$R[L] = R[L-1] + \text{increment}[L-1] \quad (3)$$

Here, R denotes a pixel value of a right view image, L denotes a pixel value of a left view image, first_value denotes an initial value of the pixel value of the right view image, and increment denotes an increased amount of the pixel value of the right view image. As the pixel value of the left view image increases by 1, a corresponding pixel value of the right view image may be defined as an increased amount of the pixel value of the right view image.

According to the right and left imbalance information with respect to Equation 3, when 'imbalance_info_indicator' is declared as an unsigned int type (1110) and 'imbalance_info_indicator' has a value of 1 (1320), a variable 'first_value' indicating an initial value of a pixel value of a right view image, and a variable 'increment' indicating an increased amount of a pixel value of a right view image may be defined as right and left imbalance information, respectively (1330).

Among Equations 1, 2, and 3, the right and left imbalance information according to Equation 3 follows the most accurate model, and the right and left imbalance information according to Equation 1 follows the simplest model.

FIG. 14 illustrates 3D image reproduction information according to an exemplary embodiment.

When the 3D image reproduction information according to the current exemplary embodiment includes the 3D image format information, the right and left arrangement information, the full resolution information, the spatial interval 3D reproduction information, the temporal interval 3D reproduction information, the 3D camera information, the low fatigue information, and the right and left imbalance information, syntax as shown in FIG. 14 may be used.

In (1420), (1430), and (1440), 3D image format information '3d_format_type', right and left arrangement information 'LR_indicator', and full resolution information 'Full_Res_indicator' are respectively declared as elementary information of the 3D image reproduction information.

In additional information of the 3D image reproduction information, an indicator indicating whether each parameter is defined or is changed, is declared. In other words, in (710) and (510), an indicator indicating whether the spatial interval 3D reproduction information is defined, and an indicator indicating whether the temporal interval 3D reproduction information is defined, are declared. Also in (810), an indicator indicating whether the 3D camera information is changed is declared, and in (910), an indicator indicating whether the low fatigue information is changed is declared. Similarly in (1110), an indicator indicating whether right and left imbalance information is defined is declared.

As described above with reference to FIG. 7, if 'spatial_local_3d_indicator' has a value of 1 (720), horizontal offset information and vertical offset information ('horizontal_offset' and 'vertical_offset') of a coordinate of a spatial interval 3D area, and width information and height information ('local_3d_width' and 'local_3d_height') of the spatial interval 3D area may be defined as the spatial interval 3D reproduction information (730).

As described above with reference to FIG. 5, if 'temporal_local_3d_indicator' has a value of 1 (520), picture number information ('remaining_3d_pictures') of an interval 3D image may be defined as the temporal interval 3D reproduction information (530).

As described above with reference to FIG. 8, if 'is_cam_params_changed' has a value of 1 (820), rotation angle information ('rotation'), translation information ('translation'), focal length information of a first view image ('primary_focal_length'), focal length information of a second view image ('secondary_focal_length'), screen aspect ratio information ('aspect_ratio'), x-axis coordinate information of a principal point of the first view image ('primary_principal_point_x'), y-axis coordinate information of the principal point of the first view image ('primary_principal_point_y'), x-axis coordinate information of a principal point of the second view image ('secondary_principal_point_x'), and y-axis coordinate information of the principal point of the second view image ('secondary_principal_point_y') may be defined as the 3D camera information (830).

As described above with reference to FIG. 9, if 'is_safety_params_changed' has a value of 1 (920), expected display width information ('expected_display_width'), expected display height information ('expected_display_height'), expected viewing distance information ('expected_viewing_distance'), minimum disparity information in 3D image content ('min_of_disparity'), and maximum disparity information in 3D image content ('max_of_disparity') may be defined as the low fatigue information (930).

As described above with reference to FIG. 12, if 'imbalance_info_indicator' has a value of 1 (1220), right and left offset information ('imbalance_offset') and slope information ('imbalance_scale') of a linear function of a right and left imbalance model may be defined as the right and left imbalance information, respectively (1230).

3D image reproduction information may be inserted into different spaces in a datastream as the occasion demands. The apparatus 100 may determine an insertion area in a datastream according to the importance of 3D image reproduction information. 3D image reproduction information having high priority may be arranged from an area where a demultiplexing or parsing operation is performed first while decoding the 3D image datastream.

For example, when 3D image format information, right and left arrangement information, and full resolution information have higher priority than 3D camera information, low fatigue information, and right and left imbalance information, the 3D image format information, the right and left arrangement information, and the full resolution information may be inserted into a datastream in such a way that the 3D image format information, the right and left arrangement information, and the full resolution information are demultiplexed or parsed first.

Figure 15A:
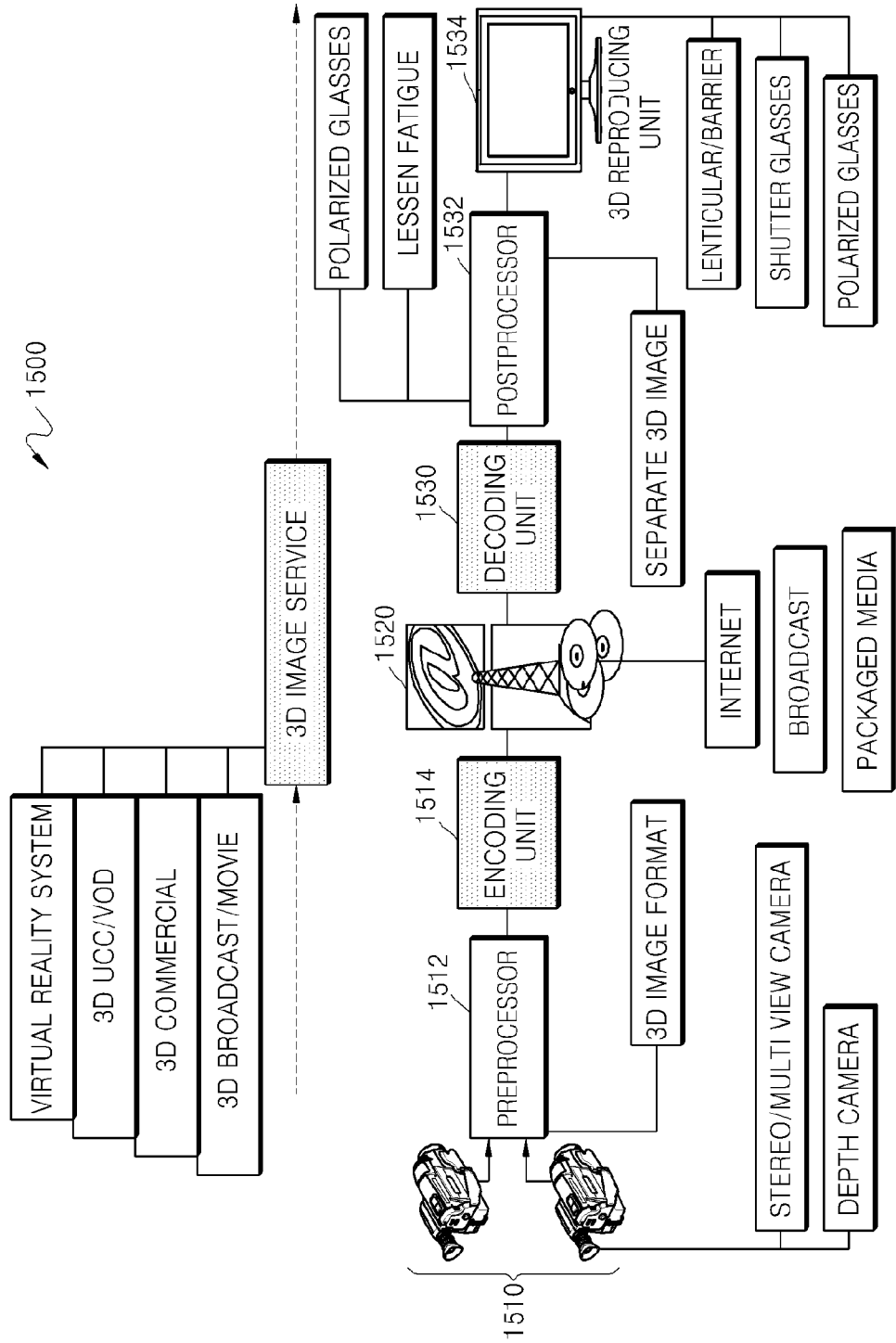
FIG. 15A is a schematic block diagram of a 3D image service system for providing a 3D image service by using 3D image reproduction information, according to an exemplary embodiment.

FIG. 15A is a schematic block diagram of a 3D image service system 1500 for providing a 3D image service by using 3D image reproduction information, according to an exemplary embodiment.

A producer may provide various types of 3D image services to a user. Examples of a 3D image service include a virtual reality system, a 3D user-created content (UCC); video on demand (VOD), a 3D commercial, and a 3D broadcast or image. The 3D UCC may be created by a user and provided to another user via the Internet. A broadcasting company may provide a 3D broadcast to a viewer by manufacturing a 3D image and transmitting the 3D image via airwaves or cables. A film company may provide a 3D movie to a consumer by using a 3D digital versatile disc (DVD) or 3D Blu-ray disc (BD) via a distributor.

The 3D image services may be provided in an image format such as a TS, program stream, or an ISO-based media file format.

The 3D image service system 1500 performs overall operation of a 3D image service provided from a producer to a consumer. The 3D image service system 1500 includes an image obtaining unit 1510, a preprocessor 1512, an encoding unit 1514, a communicating unit 1520, a decoding unit 1530, a postprocessor 1532, and a 3D reproducing unit 1534. The image obtaining unit 1510, the preprocessor 1512, and the encoding unit 1514 may be included in a transmitting terminal, and the decoding unit 1530, the postprocessor 1532, and the 3D reproducing unit 1534 may be included in a receiving terminal.

The image obtaining unit 1510 obtains a multi view image captured in a plurality of view points by using at least two cameras. A depth camera, which may directly obtain depth information between images having different view points, may be used as a camera of the 3D image obtaining unit 1510, besides a general camera that obtains a color image.

The preprocessor 1512 prepares to compress images obtained by the image obtaining unit 1510 via preprocess operations. The preprocess operations may merge a left view image and a right view image into a 3D image format, such as a stereo image format. Alternatively, the preprocess operations may perform advance preparations required to perform video compression. For example, a camera parameter, a low fatigue parameter, or the like may be determined via camera calibration. Alternatively, correspondence between the left view image and the right view image may be determined.

The encoding unit 1514 may encode a 3D image by using a conventional encoding method, by arranging the 3D image on a conventional 2D image frame or using a plurality of conventional encoders. Alternatively, the encoding unit 1514 may encode the 3D image by using a new 3D encoder using a multiview video coding (MVC) technique or 3D video encoding technique defined by MPEG.

The communicating unit 1520 may transmit compressed image data via the Internet or a broadcast, or store the compressed image data in a packaged media form. The compressed image data needs to be converted into a data format suitable for a corresponding system, in order for the communicating unit 1520 to transmit the compressed image data.

For example, in an MPEG-TS system, the compressed image data is converted from an elementary stream into a packetized elementary stream. In a broader sense, a multiplexing process may also be a conversion. Data in the form of a packetized elementary stream may be converted into the form of a program stream so as to be stored as a packaged media, and into the form of a TS so as to be transported. When the compressed image data is converted into an ISO-based media file format of an MPEG-4 system, a datastream where a header including a 'moov' box is added to image data in the form of an elementary stream may be generated, transmitted, or stored.

A method of compressing and storing/transmitting image data may follow various standards. 3D image reproduction information including imbalance information, full resolution information, right and left arrangement information, interval 3D reproduction information, 3D camera information, and low fatigue information, according to an exemplary embodiment, may be transmitted in various data formats described above, along with 3D image data.

The receiving terminal may receive data converted into the form of a predetermined data, and then convert the received data into a form recognizable by the decoding unit 1530. When the receiving terminal uses two or more decoders for a 2D image, the 3D image reproduction information is directly transmitted to the 3D reproducing unit 1534 so as to be used to reproduce the 3D image restored by the decoding unit 1530 in 3D.

The postprocessor 1532 converts the 3D image restored by the decoding unit 1530 into a form reproducible by the 3D reproducing unit 1534. For example, the postprocessor 1532 may separate a 3D image format into a left view 2D image and a right view 2D image. Also, the postprocessor 1532 may not only render the 3D image, but may also reduce visual fatigue by using 3D camera information and low fatigue information.

The 3D reproducing unit 1534 reproduces multi-view images in 3D by using the 3D image reproduction information. The 3D reproducing unit 1534 may use a 3D reproducing technique such as a lenticular method, a barrier method, a shutter glasses method, or a polarized glasses method.

Accordingly, the 3D image service system 1500 effectively compresses, transmits, receives, restores, and uses the 3D image reproduction information.

Figure 15B:
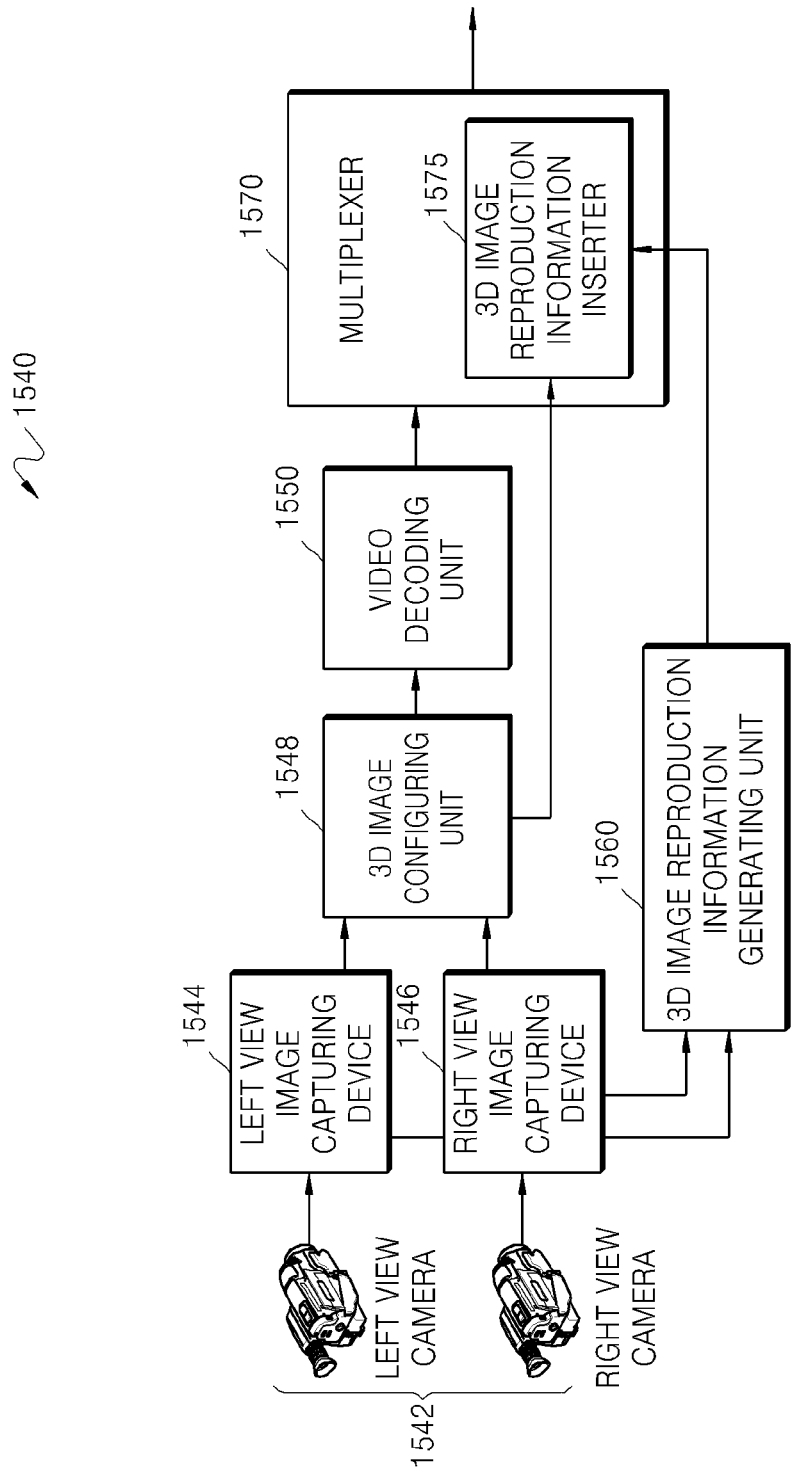
FIG. 15B is a schematic block diagram of an apparatus for transmitting a 3D image, the according to an exemplary embodiment, wherein the apparatus generates 3D image reproduction information.

FIG. 15B is a block diagram of an apparatus 1540 for transmitting a 3D image, according to an exemplary embodiment, wherein the apparatus 1540 generates 3D image reproduction information.

The apparatus 1540 may generate parameters on the left and right views of a stereo image. The apparatus 1540 includes two cameras 1542, a left view image capturing device 1544, a right view image capturing device 1546, a 3D image configuring unit 1548, a video decoding unit 1550, a 3D image reproduction information generating unit 1560, and a multiplexer 1570.

A left view image sequence and a right view image sequence, which are respectively photographed by a left view camera and a right view camera of the cameras 1542, and respectively captured by the left view image capturing device 1544 and the right view image capturing device 1546, are generated.

The 3D image configuring unit 1548 configures the left view image sequence and the right view image sequence in a 3D image format, such as a side-by-side format, a top and bottom format, or the like. According to the employed 3D image format, the 3D image configuring unit 1548 may output reproduction information, such as 3D image format information, right and left arrangement information, full resolution information, interval 3D reproduction information, or the like, and transmit the output reproduction information to the multiplexer 1570.

The video decoding unit 1550 compresses the 3D image format and outputs the compressed 3D image format in the form of an elementary stream form. The multiplexer 1570 converts compressed 3D image data in the form of an elementary stream into a data format, such as a TS, a program stream, or an ISO-based media file format.

The 3D image reproduction information generating unit 1560 generates various types of 3D image reproduction information required to reproduce the left view image and the right view image respectively obtained from the left view image capturing device 1544 and the right view image capturing device 1546, in 3D. Here, the generated 3D image reproduction information may include parameters related to a camera, parameters related to low fatigue, and imbalance information.

The 3D image reproduction related information, such as the 3D image format information, the right and left arrangement information, the full resolution information, and the interval 3D reproduction information, output by the 3D image configuration unit 1548, and such as the parameters related to a camera, the parameters related to low fatigue, and the imbalance information, generated by the 3D image reproduction information generating unit 1560 are input to a 3D image reproduction information inserter 1575 of the multiplexer 1570.

The 3D image reproduction information inserter 1575 may insert the 3D image reproduction information into the 3D image data format generated by the multiplexer 1570. Accordingly, not only the compressed 3D image data, but also the 3D image reproduction information is included in the 3D image data format generated by the multiplexer 1570.

The 3D image reproduction information generated by the apparatus 1540 may be used by the apparatus 100. Alternatively, the multiplexer 1570 of the apparatus 1540 may correspond to the apparatus 100.

Here, the 3D image reproduction information inserter 1575 determines a location from among a section to insert the 3D image reproduction information. Accordingly, the 3D image reproduction information inserter 1575 may control the section generator 130 to insert the 3D image reproduction information into a certain location.

Figure 15C:
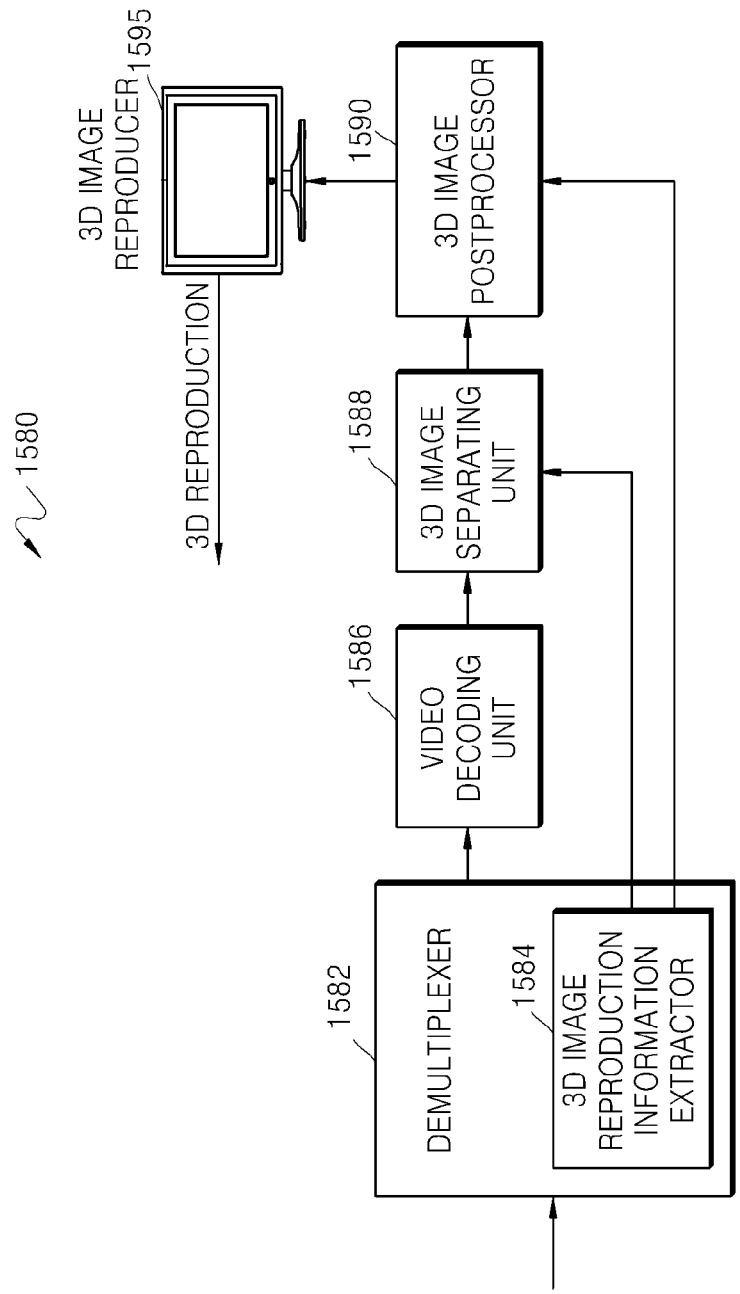
FIG. 15C is a block diagram of an apparatus for reproducing a 3D image, according to an exemplary embodiment, wherein the apparatus uses 3D image reproduction information.

FIG. 15C is a block diagram of an apparatus 1580 for reproducing a 3D image, according to an exemplary embodiment, wherein the apparatus 1580 uses 3D image reproduction information.

The apparatus 1580 may reproduce a stereo image in a left view and a right view. The apparatus 1580 includes a demultiplexer 1582, a video decoding unit 1586, a 3D image separating unit 1588, a 3D image postprocessor 1590, and a 3D image reproducer 1595.

The apparatus 1580 receives a 3D image datastream in a TS, a program stream, or an ISO-based media file format. The demultiplexer 1582 may demultiplex the received 3D image datastream, and classify and extract an elementary stream about a 3D image and 3D image reproduction information about the 3D image.

The video decoding unit 1586 restores 3D image data from the extracted elementary stream about the 3D image. The 3D image data may not only have a 3D image format, such as a side-by-side format, but also have a format using depth data or a format using at least two elementary streams.

A 3D image reproduction information extractor 1584 included in the demultiplexer 1582 extracts 3D image format information, right and left arrangement information, full resolution information, interval 3D reproduction information, parameters related to a camera, parameters related to low fatigue, and imbalance information from among the 3D image reproduction information.

The 3D image format information, the right and left arrangement information, the full resolution information, and the interval 3D reproduction information may be output to the 3D image separating unit 1588, and the parameters related to a 3D camera system, the parameters related to low fatigue, and the imbalance information may be output through the 3D image postprocessor 1590.

The 3D image separating unit 1588 separates the 3D image into a left view image and a right view image, by using the 3D image format information, the right and left arrangement information, the full resolution information, and the interval 3D reproduction information extracted by the 3D image reproduction information extractor 1584. The 3D image postprocessor 1590 may calibrate the 3D image so as to reduce 3D fatigue, by using the parameters related to a 3D camera system, the parameters related to low fatigue, and the imbalance information.

The 3D image processed by the 3D image postprocessor 1590 is reproduced by the 3D image reproducer 1595.

The apparatus 200 may correspond to the apparatus 1580. In other words, the TS demultiplexer 210, the TS packet depacketizer 220, the PES depacketizer 230, and the 3D image reproduction information extractor 240 correspond to the demultiplexer 1582 and the 3D image reproduction information extractor 1584 four things correspond to two things. Also, the 3D image restorer 250 may correspond to the video decoding unit 1586 and the 3D image separating unit 1588. The 3D image reproducer 260 may correspond to the 3D image postprocessor 1590 and the 3D image reproducer 1595.

A case when 3D image reproduction information is inserted into a program guide information section from among at least one section will now be described with reference to FIGS. 16 through 21. Specifically, the 3D image reproduction information may be inserted in a descriptor format, into a descriptor area of a section.

The 3D image reproduction information may be inserted into the program guide information section including EPG information. The EPG information denotes a broadcasting schedule, which is shown to a user by using a set-top box or a PVR.

The program guide information section including the EPG information may be an EIT section. An EIT is a table for transmitting data of the broadcasting schedule, and provides a temporal order and detailed contents of individual broadcasts. The data is included in a section. The EIT may include one section, but since, in many situations, a plurality of pieces of data are included in the EIT, the EIT may include 8 sections or less to transmit data in a packet. Accordingly, it may be required to assemble a plurality of sections into a table, in order to form EPG data. A table formed of a plurality of sections includes information about individual events. An EPG is formed by parsing the information about individual events, rearranging the parsed information into a table format for convenience of a user, and transmitting the rearranged information to an on screen display (OSD) or a user interface (UI).

A digital broadcasting program may be transmitted using a satellite or cable. One type of program service is prepared into a plurality of audio and video, and datastream, whereas a plurality of program services are multiplexed, and transmitted via one relay in case of a satellite, and via a frequency channel band in case of a cable and a terrestrial broadcast. A location of a required stream needs to be determined so as to receive the required stream from among a plurality of transmitted streams. Service information provides a method of determining the location of the required stream.

The DVB standard defines service information transmission in a digital broadcasting using MPEG-2. An MPEG-2 system layer defines service information of PSI. The PSI may transmit information to a receiver so that the receiver demultiplexes a certain stream in multiplexed streams, and decodes the certain stream. Examples of the PSI include PAT, a conditional access table (CAT), PMT, and a network information table (NIT), which are defined by the MPEG-2 standard.

A PAT transmits PID information of a PMT corresponding to various services provided by a transmitter, and PID information of an NIT that will be described later. A CAT transmits information about a charged broadcasting system used by a transmitter, and the information is defined and used differently than contents transmitted according to the charged broadcasting system. Also, a PMT transmits PID information of a TS packet including a service and a type of the service, and PID information about Program Clock Reference (PCR) information. An NIT is defined by DVB to be compatible with MPEG-2, and transmits information about an actual transmission network.

In addition to the PSI, guide information about a service provided to a viewer and individual programs are provided. The guide information not only includes information about a transmission network for transmitting the guide information, but also information about other transmission networks. One type of the guide information is an EIT.

According to program guide and service information using an ATSC method, program guide and channel transmission information is transmitted in a combination of tables of PSIP.

The ATSC method is similar to the DVB method, wherein an NIT table is used in service information called SI, and EPG information is transmitted using an EIT, a running status table (RST), a service description table (SDT), and a time and date table (TDT).

In the ATSC method, various types of tables, such as a system time table (STT), a rating region table (RRT), a master guide table (MGT), and a virtual channel table (VCT), are transmitted to an elementary transport packet including a base-PID, an EIT is transmitted to a transport packet having a PID defined by a MGT, and an extended text table (ETT) is transmitted to a third type of transport packet having a PID that is defined by a MGT and different from the PID of the transport packet receiving the EIT.

The DVB method uses PSI, which is an intrinsic standard of MPEG-2 for classifying programs, and a DVB-SI standard, which includes network information and program guide information transmitted via a cable or a satellite. However, in the ATSC method, PSIP is used for classification of information transmitted to a corresponding transmission channel, and service information such as program guide information. The ATSC method can classify channels without using PSI, which is a part of the MPEG-2 system standard, and transmit the PSI for compatibility with MPEG-2, even if the PSI is not required.

Even though the DVB method of Europe and the ATSC method of the USA are different from each other, both methods use an EIT, which is periodically transmitted and received to provide individual program information to a viewer. Accordingly, the 3D image reproduction information is inserted into the EIT that is periodically provided to a transmitter of the viewer, and thus the 3D image is smoothly reproduced.

Data tables having a section format transmit various pieces of service related information by using an intrinsic description and a descriptor. For example, the data tables may display viewable age, or transmit subtitle information or time shift information. The EIT is a table for describing program information. A receiver may realize an electronic program guide service, such as EPG, by using information in the EIT.

In detail, a title and a starting time of a program at a certain time are included in the EIT. An identifier, a starting time, and a reproduction time are set according to each event. Also, a descriptor area may be assigned for each event.

FIG. 16 is a table showing a descriptor area tag to which a 3D image reproduction descriptor is to be inserted, according to an exemplary embodiment.

A descriptor area is used to define a program and a program element, and all descriptors start with a descriptor tag (descriptor_tag) and a descriptor length (descriptor_length). A descriptor type is identified according to a descriptor tag, and some descriptor tags may be assigned to a user private area used by a user. The descriptor area may be assigned to a program guide information section, or to a separate descriptor section.

In the apparatuses 100 and 200, a part of the descriptor area of the program guide information section may be used for a 3D image reproduction descriptor.

3D image reproduction information may be divided into 5 3D reproduction descriptors, thereby revising or dividing a format of each 3D reproduction descriptor according to a system specification and environment. The 5 3D reproduction descriptors are a 3D information start descriptor for 3D start information, a 3D camera descriptor for 3D camera information, a low fatigue descriptor for low fatigue information, an interval 3D reproduction descriptor for spatial interval 3D reproduction information and temporal interval 3D reproduction information, and a right and left imbalance descriptor for right and left imbalance information.

The total number of descriptor tags is 256, wherein $64^{th}$ through $255^{th}$ descriptor areas may be arbitrarily assigned by a user. Accordingly, the 3D image reproduction information may be stored in a part of the user private descriptor area, in a descriptor format. The descriptor format may be revised or separated according to a system. A spare descriptor area may be secured so as to add additional information for 3D image reproduction later.

For example, the 3D image reproduction information inserter 140 of FIG. 1 may assign a 3D camera descriptor (3d_camera_descriptor) to a $251^{st}$ descriptor tag, a low fatigue descriptor (3d_safety_descriptor) to a $252^{nd}$ descriptor tag, an interval 3D reproduction descriptor (local_3d_descriptor) to a $253^{rd}$ descriptor tag, a right and left imbalance descriptor (imbalance_descriptor) to a $254^{th}$ descriptor tag, and a 3D information start descriptor (3d_info_descriptor) to a $255^{th}$ descriptor tag.

The 3D image reproduction information inserted into the descriptor area of the program guide information section by using the apparatus 100 will now be described with reference to FIGS. 17 through 21. Similarly, the apparatus 200 may extract the 3D image reproduction information from the descriptor area.

Each event uses a descriptor area, and thus, when a 2D program and another 2D program coexist, information whether an image is a 2D image or a 3D image may be contained in an EIT, according to each event.

Additional information for the 3D image reproduction may vary according to each program. For example, not all programs require the 3D camera information, the low fatigue information, or the right and left imbalance information. A program may or may not support the additional information. Accordingly, a descriptor supported by each event may be defined.

FIG. 17 is a table showing a 3D information start descriptor (3d_info_descriptor) 1700 inserted into a descriptor area, according to an exemplary embodiment.

The 3D information start descriptor 1700 includes a descriptor tag 1710, descriptor length information 1720, and elementary information 1730 from among 3D image reproduction information. The elementary information 1730 includes 3D start information (threed_info_start_code), 3D image format information (3d_format_type), right and left arrangement information (LR_indicator), and full resolution information (Full_Res_indicator).

Since the 3D information start descriptor 1700 is located in an area that is first parsed or read, a decoding terminal may first determine that 3D image reproduction descriptors exist in a corresponding section.

FIG. 18 is a table showing a 3D camera descriptor (3d_camera_descriptor) 1800 inserted into a descriptor area, according to an exemplary embodiment.

The 3D camera descriptor 1800 includes a descriptor tag 1810, descriptor length information 1820, and 3D camera information 1830, as described with reference to FIG. 8.

FIG. 19 is a table showing a low fatigue descriptor (3d_safety_descriptor) 1900 inserted into a descriptor area, according to an exemplary embodiment.

The low fatigue descriptor 1900 includes a descriptor tag 1910, descriptor length information 1920, and low fatigue information 1930 as described with reference to FIG. 9.

FIG. 20 is a table showing an interval 3D descriptor (local_3d_descriptor) 2000 inserted into a descriptor area, according to an exemplary embodiment.

The interval 3D descriptor 2000 includes a descriptor tag 2010, descriptor length information 2020, and interval 3D reproduction information 2030, including spatial interval 3D reproduction information and temporal interval 3D reproduction information, as described with reference to FIG. 6.

Figures 21, 22:
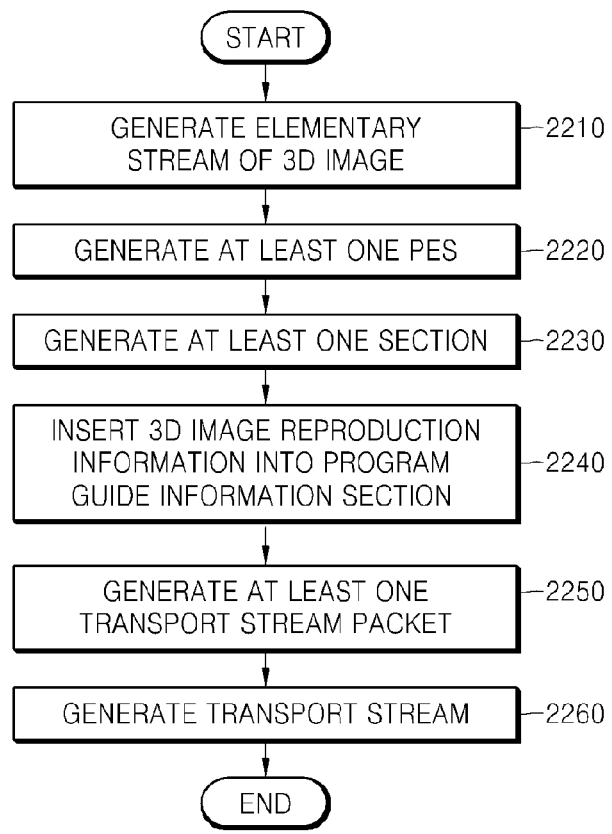
FIG. 21 is a table showing a right and left imbalance descriptor inserted into a descriptor area, according to an exemplary embodiment.
FIG. 22 is a flowchart illustrating a method of transmitting a 3D image datastream, according to an exemplary embodiment.

FIG. 21 is a table showing a right and left imbalance descriptor (imbalance_descriptor) 2100 inserted into a descriptor area, according to an exemplary embodiment.

The right and left imbalance descriptor 2100 includes a descriptor tag 2110, descriptor length information 2120, and right and left imbalance information 2130 as described with reference to FIG. 12.

FIG. 22 is a flowchart illustrating a method of transmitting a 3D image datastream, according to an exemplary embodiment.

In operation 2210, an elementary stream including an encoded bit string of a 3D image is generated. In the 3D image, a 3D image or a 2D image may be mixed together. In a 3D image format, a left view image and a right view image may be included in one frame, or different view images may be arranged in different frames. Alternatively, different view images may be formed in different elementary streams.

In operation 2220, the elementary stream is packetized, and thus, at least one PES is generated.

In operation 2230, at least one section is generated by multiplexing program and service related information of the 3D image. The at least one section may include a PAT section, a PMT section, a CAT section, an EIT section, and a private section.

In operation 2240, 3D image reproduction information required to reproduce the 3D image is inserted into a program guide information section from among the at least one section. The 3D image reproduction information may be inserted into a descriptor area of the EIT section from among the program guide information section.

In operation 2250, at least one TS packet is generated for each of the at least one section and the at least one PES. The TS packet has 188 bytes, including 4 bytes of header area and 184 bytes of payload area.

In other words, the 3D image reproduction information required to reproduce the 3D image may be inserted in the program guide information section. The 3D image reproduction information includes information about a 3D image format, information about an arrangement order of a left view image and a right view image, information about whether a left view image and a right view image form a 3D image while maintaining full resolution, information about an image for spatial interval 3D reproduction, information about an image for temporal interval 3D reproduction, information about a 3D camera system, information required for low fatigue operation, and information about an imbalance model of a left view image and a right view image.

The 3D image reproduction information, i.e., the 3D image format information, the right and left arrangement information, the full resolution information, the interval 3D image reproduction information, the 3D camera information, the low fatigue information, and the right and left imbalance information, may be inserted into a descriptor area of a section, according to a descriptor format.

In operation 2260, a TS is generated by multiplexing the generated TS packet.

According to an exemplary embodiment, in a TS-based system, an elementary stream may be multiplexed into a TS by packetizing the elementary stream, but in a program stream-based system, an elementary stream may be multiplexed into a program stream by packetizing the elementary stream.

In a TS system according to a predetermined image communication standard, 3D image reproduction information may be inserted into a space pre-assigned to a section. Accordingly, the method of FIG. 22 may be applied to a TS system according to a conventional image communication standard, without changing the TS system. Also, the 3D image reproduction information may be provided without additionally assigning a transport channel or an information storage space.

Figure 23:
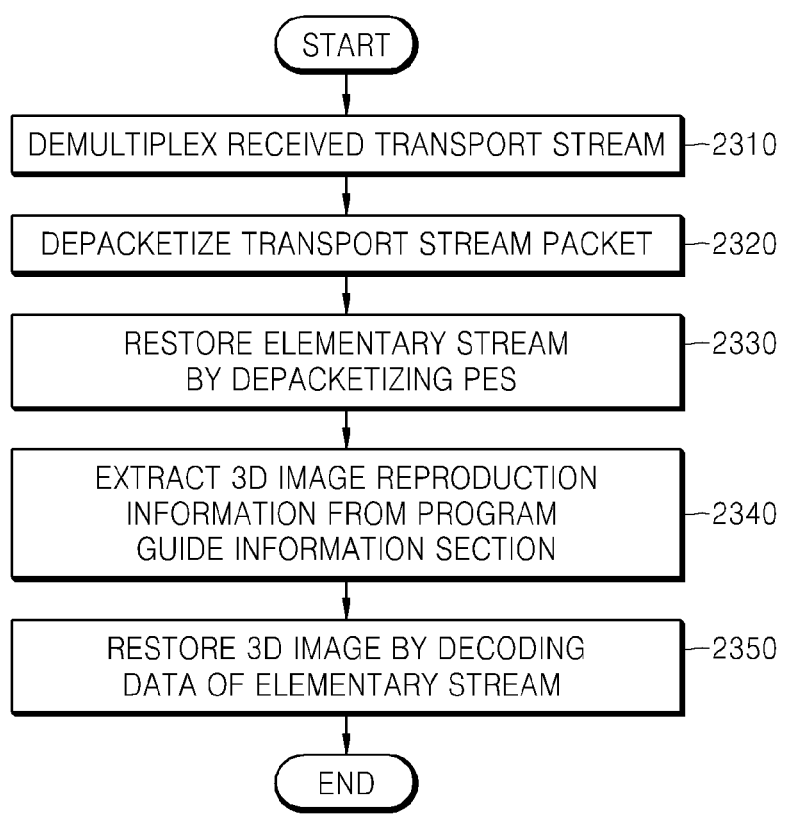
FIG. 23 is a flowchart illustrating a method of receiving a 3D image datastream, according to an exemplary embodiment.

FIG. 23 is a flowchart illustrating a method of receiving a 3D image datastream, according to an exemplary embodiment.

In a TS-based system, a TS is received and demultiplexed into an elementary stream, whereas in a program stream-based system, a program stream is received and demultiplexed into an elementary stream.

In operation 2310, a received TS is demultiplexed, and thus separated into at least one TS packet. The TS is demultiplexed into a TS packet having 188 bytes.

In operation 2320, the at least one TS packet is depacketized, and thus restored into at least one PES and at least one section. The PES stores 3D image data, and the at least one section stores program and service related information of the 3D image data.

In operation 2330, the at least one PES is depacketized thereby restoring an elementary stream. Encoded data of the 3D image data, such as video data or audio data, is inserted into the elementary stream.

In operation 2340, 3D image reproduction information required to reproduce a 3D image is extracted from a program guide information section from among the at least one section.

The 3D image reproduction information may be extracted from an EIT section from among the program guide information section. Specifically, the 3D image reproduction information inserted in a descriptor format into a descriptor area of the EIT section may be extracted.

In operation 2350, an elementary stream is restored by depacketizing the at least one PES. The 3D image is restored by decoding data of the elementary stream. The restored 3D image may be reproduced using a 3D reproduction method, by using the extracted 3D image reproduction information.

The 3D image reproduction information recognizable by a 3D reproduction system is extracted by using the 3D reproduction method, and thus a 3D content broadcasting service, which guarantees a 3D effect and low visual fatigue, is provided. Since the method has a conventional data structure used in a conventional 2D image system, the method may also be used in a conventional 2D image system.

The exemplary embodiments can be written as computer programs and can be implemented in general-use digital computers that execute the programs using a computer readable recording medium. Examples of the computer readable recording medium include storage media including magnetic storage media (e.g., ROM, floppy disks, hard disks, etc.) and optical recording media (e.g., CD-ROMs, or DVDs).

While exemplary embodiments have been particularly shown and described, it will be understood by those of ordinary skill in the art that various changes in form and details may be made therein without departing from the spirit and scope of the present invention as defined by the following claims.

What is claimed is:

1. A method of receiving a video service, the method comprising:
   receiving a transport stream comprising at least one of a 2-dimensional (2D) video service and a 3-dimensional (3D) video service;
   extracting identification information indicating whether the video service is the 2D video service or the 3D video service based on a first descriptor in PSIP (Program and System Information Protocol) information extracted from the transport stream;
   extracting 3D format information indicating a format in which main-view video data and additional-view video data compose the 3D video service, from a second descriptor in the PSIP information; and
   displaying the 3D video service by using the main-view video data and the additional-view video data decoded respectively from the transport stream, based on the 3D format information,
   wherein the PSIP information comprises an Event Information Table (EIT), and
   wherein the identification information is extracted from the EIT for each event unit of the video service.

2. The method of claim 1, wherein the 3D format information indicates which one among a side-by-side format, a top-and-bottom format and a full-picture format the 3D video service is provided in.

3. The method of claim 1, wherein the displaying of the 3D video service comprises:
   reconstructing a first elementary stream and a second elementary stream from the transport stream;
   decoding the main-view video data extracted from the first elementary stream by using a first decoder; and
   decoding the additional-view video data extracted from the second elementary stream by using a second decoder.

4. A method of transmitting a transport stream for providing a video service, the method comprising:
   generating a first elementary stream comprising main-view video data of 3D video service;
   generating a second elementary stream comprising additional-view video data of the 3D video service;
   inserting identification information indicating whether the video service is the 2D video service or the 3D video service, into a first descriptor of Program and System Information Protocol (PSIP); and inserting 3D format information indicating a format in which main-view video data and additional-view video data compose the 3D video service, into a second descriptor of the PSIP; and transmitting the transport stream generated by multiplexing the first elementary stream, the second elementary stream and the PSIP, wherein the PSIP information comprises an Event Information Table (EIT), and wherein the identification information is inserted into the EIT for each event unit of the video service.

5. The method of claim 4, wherein the 3D format information indicating which one of a side-by-side format, a top-and-bottom format and a full-picture format the 3D video service is provided in.

6. The method of claim 4, wherein the generating of the first elementary stream comprises encoding the main-view video data by using a first encoder; and wherein the generating of the second elementary stream comprises encoding the additional-view video data encoded by using a second encoder.

* * * * *